United States Patent
Lange et al.

[19]

[11] Patent Number: 5,998,948
[45] Date of Patent: Dec. 7, 1999

[54] CONVERTIBLE ROOF ACTUATION MECHANISM

[75] Inventors: Eric W. Lange, Dearborn; Kenneth L. Wardell, Monroe; Rick J. Simpson, LaSalle, all of Mich.

[73] Assignee: ACS Incorporated, Southgate, Mich.

[21] Appl. No.: 09/087,795

[22] Filed: May 29, 1998

[51] Int. Cl.⁶ .................................................. B60J 7/08
[52] U.S. Cl. ........................................ 318/280; 296/122
[58] Field of Search .................................. 318/280–286, 318/466–470, 34, 53; 296/107–134

[56] References Cited

U.S. PATENT DOCUMENTS

| | | |
|---|---|---|
| 2,230,140 | 1/1941 | Falcon . |
| 2,267,471 | 12/1941 | Keller . |
| 2,297,820 | 10/1942 | Westrope . |
| 2,322,839 | 6/1943 | Falcon . |
| 2,329,802 | 9/1943 | Westrope . |
| 2,368,133 | 1/1945 | Galamb . |
| 2,372,583 | 3/1945 | Keller . |
| 2,376,949 | 5/1945 | Westrope . |
| 2,459,089 | 1/1949 | Orr . |
| 2,540,454 | 2/1951 | Milhan . |
| 2,580,486 | 1/1952 | Vigmostad . |
| 2,768,857 | 10/1956 | Albrecht . |
| 2,770,489 | 11/1956 | Garvey et al. . |
| 2,895,764 | 7/1959 | Himka et al. . |
| 3,030,140 | 4/1962 | Probst . |
| 3,536,354 | 10/1970 | Ingram . |
| 3,994,524 | 11/1976 | Lehmann . |
| 4,487,447 | 12/1984 | Schroder . |
| 4,537,440 | 8/1985 | Brockway et al. . |
| 4,720,133 | 1/1988 | Alexander et al. . |
| 4,778,215 | 10/1988 | Ramaciotti . |
| 4,784,428 | 11/1988 | Moy et al. . |
| 4,828,317 | 5/1989 | Muscat . |
| 4,838,601 | 6/1989 | Kolb . |
| 4,936,626 | 6/1990 | Gmeiner et al. . |
| 4,948,194 | 8/1990 | Dogliani . |
| 5,067,768 | 11/1991 | Fischbach . |
| 5,161,852 | 11/1992 | Alexander et al. . |
| 5,225,747 | 7/1993 | Helms et al. . |
| 5,338,085 | 8/1994 | Guckel et al. . |
| 5,385,381 | 1/1995 | Moore et al. . |
| 5,429,409 | 7/1995 | Corder et al. . |
| 5,445,429 | 8/1995 | Koehler et al. . |
| 5,620,226 | 4/1997 | Sautter, Jr. . |
| 5,667,269 | 9/1997 | Prenger et al. . |
| 5,749,619 | 5/1998 | Mentink ................................. 296/107 |
| 5,769,483 | 6/1998 | Danzl et al. ........................... 296/107 |
| 5,772,274 | 6/1998 | Tokarz ................................... 296/117 |
| 5,810,422 | 9/1998 | Corder et al. ......................... 296/108 |

FOREIGN PATENT DOCUMENTS

| | | |
|---|---|---|
| 364774 | 11/1981 | Austria . |
| 530770 | 9/1956 | Canada . |
| 0 351 378 | 1/1990 | European Pat. Off. . |
| 2 661 140 | 10/1991 | France . |
| 3724531 C1 | 12/1988 | Germany . |
| 3937764 C1 | 12/1990 | Germany . |
| 4129493 | 8/1992 | Germany . |
| 548569 | 9/1956 | Italy . |
| 836677 | 6/1960 | United Kingdom . |
| 995393 | 6/1965 | United Kingdom . |
| 1 223 070 | 2/1971 | United Kingdom . |

*Primary Examiner*—Jonathan Salata
*Attorney, Agent, or Firm*—Harness, Dickey & Pierce, P.L.C.

[57] ABSTRACT

A convertible roof actuation mechanism includes a pliable roof cover, a top stack mechanism supporting the roof cover, and at least one roof bow of the top stack mechanism independently movable relative to the remainder of the top stack mechanism for selectively reducing and increasing tension of the roof cover during latching. Another aspect of the present invention provides a single driving mechanism, for each side of the vehicle, to operate both the tension relieving roof bow and the top stack mechanism.

29 Claims, 9 Drawing Sheets

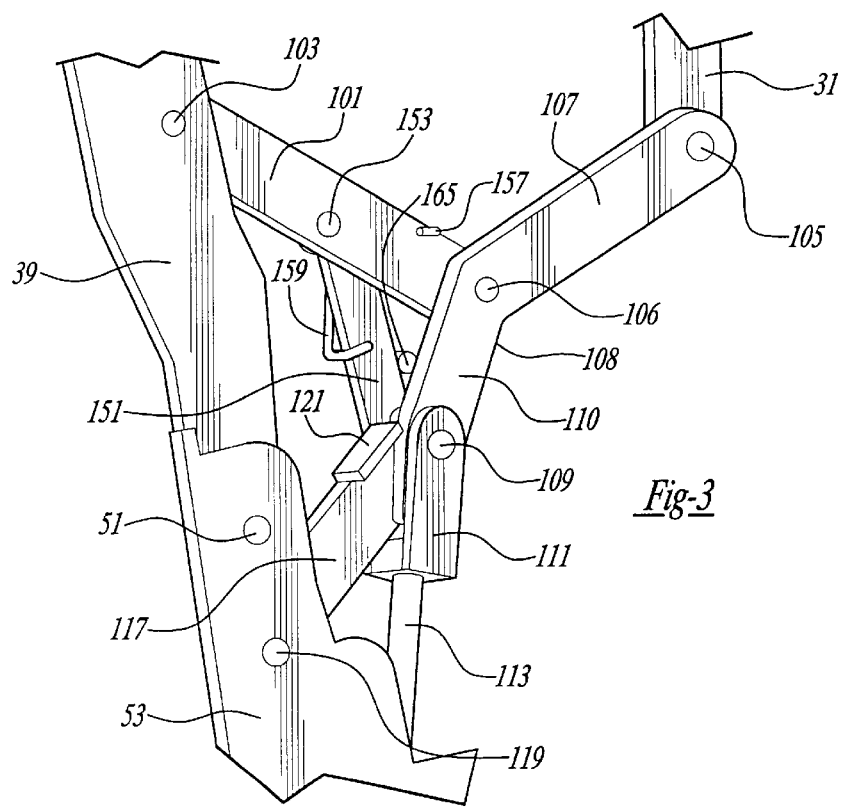
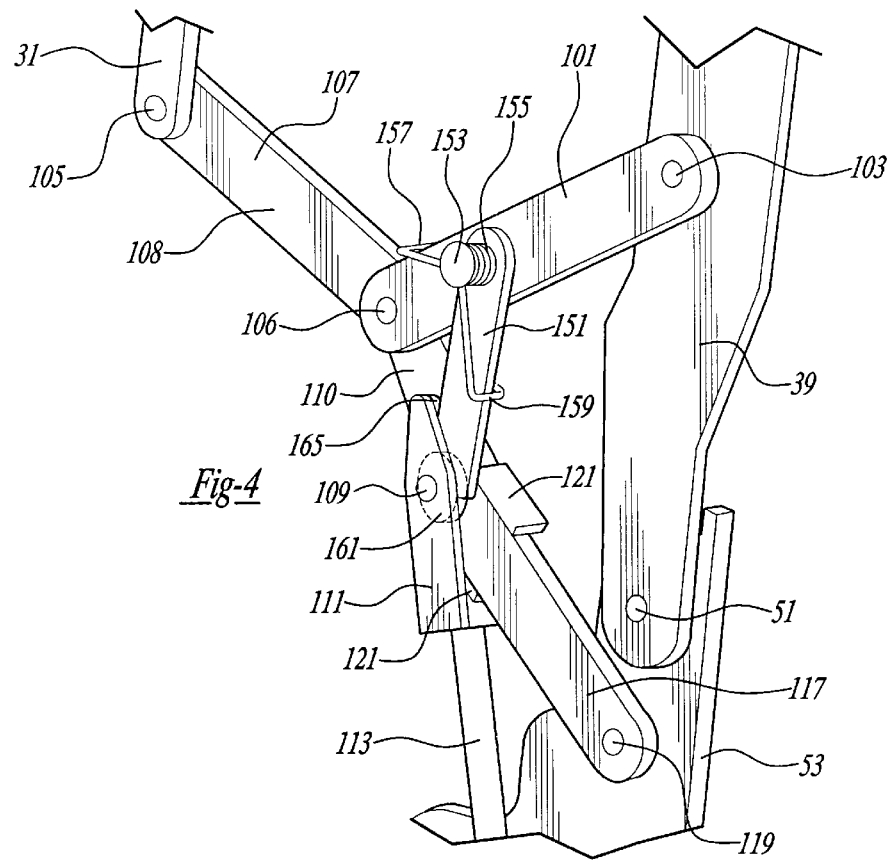

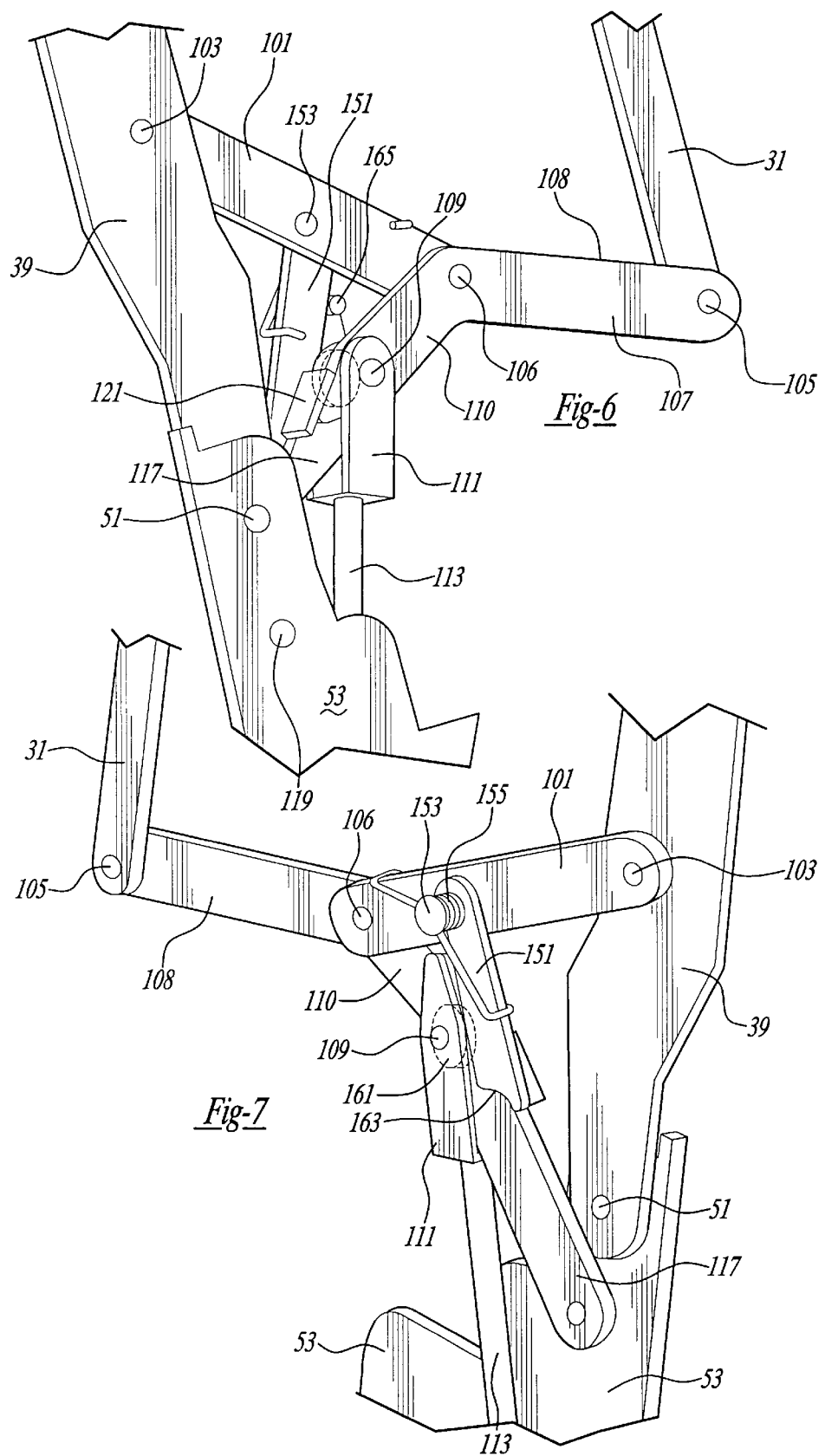

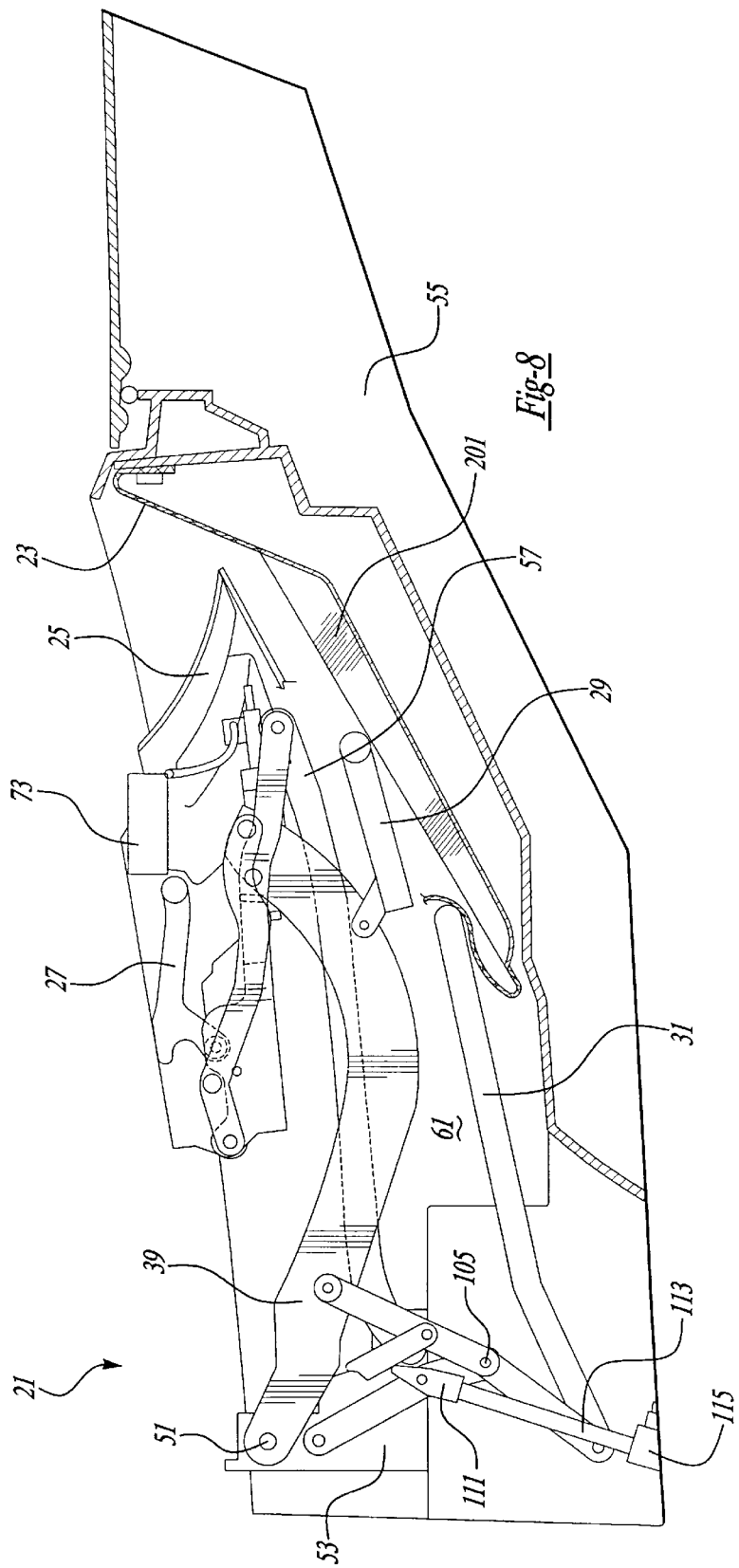

CONVERTIBLE ROOF ACTUATION MECHANISM

BACKGROUND AND SUMMARY OF THE INVENTION

This invention relates generally to automotive vehicle convertible roofs and more particularly to a convertible roof actuation mechanism.

Traditional soft-top convertible roofs for automotive vehicles typically employ four or five roof bows, having an inverted U-shape, spanning transversely across the vehicle for supporting a vinyl, canvas or polyester fiber pliable roof cover. The number one roof bow is mounted to a pair of front roof rails and is typically latched to a stationary front header panel of the automotive vehicle body disposed above a windshield. A number two roof bow is typically mounted to a pair of center roof rails which are pivotably coupled to the front roof rails. Furthermore, the number three, four and optional five roof bows are commonly mounted to a pair of rear roof rails which are pivotably coupled to the center roof rails. For example, reference should be made to U.S. Pat. Nos. 5,338,085 entitled "Folding Top for Motor Vehicles" which issued to Guckel et al. on Aug. 16, 1994; 5,225,747 entitled "Single-Button Actuated Self-Correcting Automatic Convertible Top" which issued to Helms et al. on Jul. 6, 1993; 5,161,852 entitled "Convertible Top with Improved Geometry" which issued to Alexander et al. on Nov. 10, 1992; 4,948,194 entitled "Flexible Roof for a Convertible Motor Vehicle, Provided with a Safety Hook for the Rear Arch of the Roof Frame" which issued to Dogliani on Aug. 14, 1990; 4,720,133 entitled "Convertible Top Structure" which issued to Alexander et al. on Jan. 19, 1988; 4,537,440 entitled "Vehicle with a Convertible Top" which issued to Brockway et al. on Aug. 27, 1985; and 2,580,486 entitled "Collapsible Top for Vehicles" which issued to Vigmostad on Jan. 1, 1952.

Traditional soft-top convertible roofs possess an inherent drift problem. In other words, when the convertible roof is moved to its fully raised position, the forwardmost or number one roof bow is positioned against the front header panel for subsequent latching. However, the stretched fabric cover acts to pull the number one roof bow in an unintended and undesired rearward direction such that it drifts away from the front header. This drifting situation is especially apparent in new convertible roofs. Accordingly, the vehicle occupant must then physically pull down upon a handle attached to the number one roof bow and hold it against the front header panel for subsequent latching. This manual action presents a crude and unrefined operational perception. This drifting problem is also present between a rearmost or number five roof bow and an adjacent tonneau cover. The number five roof bow and attached rear edge of the cover are often raised to an upward position by separate actuators while the tonneau cover is returned from a substantially vertical position to a substantially horizontal position; the number five roof bow is then pivoted to its lowered position against an upper surface of the tonneau cover for latching thereto. However, the stretched fabric covering tends to pull the number five roof bow in a forward manner thereby causing it to drift away from the tonneau cover. This situation is inconvenient to remedy due to the difficulty of an occupant accessing this rear area when seated in the front seat.

Notwithstanding, U.S. Pat. No. 5,385,381 entitled "Vehicle Roofs," which issued to Moore et al. on Jan. 31, 1995, employs a moving number four roof bow to tension a fabric cover. However, this patent discloses directly attaching each leg of the number four roof bow to a corresponding main balance link. Furthermore, a first gas strut acts between the number four roof bow and the balance link while a second hydraulic ram, per side of vehicle, moves the number four roof bow through a clevis and pin arrangement.

In accordance with the present invention, the preferred embodiment of a convertible roof actuation mechanism includes a pliable roof cover, a top stack mechanism supporting the roof cover, and at least one roof bow of the top stack mechanism independently movable relative to the remainder of the top stack mechanism for selectively reducing and increasing tension of the roof cover during latching. Another aspect of the present invention provides a single driving mechanism, such as a piston, for each side of the vehicle, to operate both the tension relieving roof bow movement and the top stack mechanism movement. In a further aspect of the present invention, a rigid backlite is attached to a pliable roof cover. Still another aspect of the present invention provides a more compact and reliable roof bow locking mechanism and linkage arrangement. Yet another aspect of the present invention employs multiple links and a connector to couple an optional number five roof bow to a number four roof bow for simultaneously moving the numbers four and five roof bows to tighten or loosen the fabric roof.

The convertible roof actuation mechanism of the present invention is advantageous over conventional devices in that the present invention reduces drifting of the raised convertible roof away from the front header panel and, alternately a tonneau cover, by selectively reducing and then increasing tension or tautness of the roof cover. Furthermore, packaging space of the stowed convertible roof is optimized in the storage compartment by the linkage movement of a number four roof bow; this allows for placement of a very large and rigid backlite in a relatively small storage compartment, thereby avoiding the creasing and discoloration disadvantages commonly associated with folded flexible backfires made of plastic. The present invention is also advantageously employed in combination with stationary affixation of the rear edge of the roof cover to the body where front header panel latching drift and tension problems are often exacerbated. Moreover, the single driving mechanism, per side of vehicle, used for operating the tension reducing roof bow and the top stack mechanism is much more cost effective and less failure prone as compared to a more complicated, traditional two pistons/rams per vehicle side. Additional advantages and features of the present invention will become apparent from the following description and appended claims, taken in conjunction with the accompanying drawings.

Figure 2:
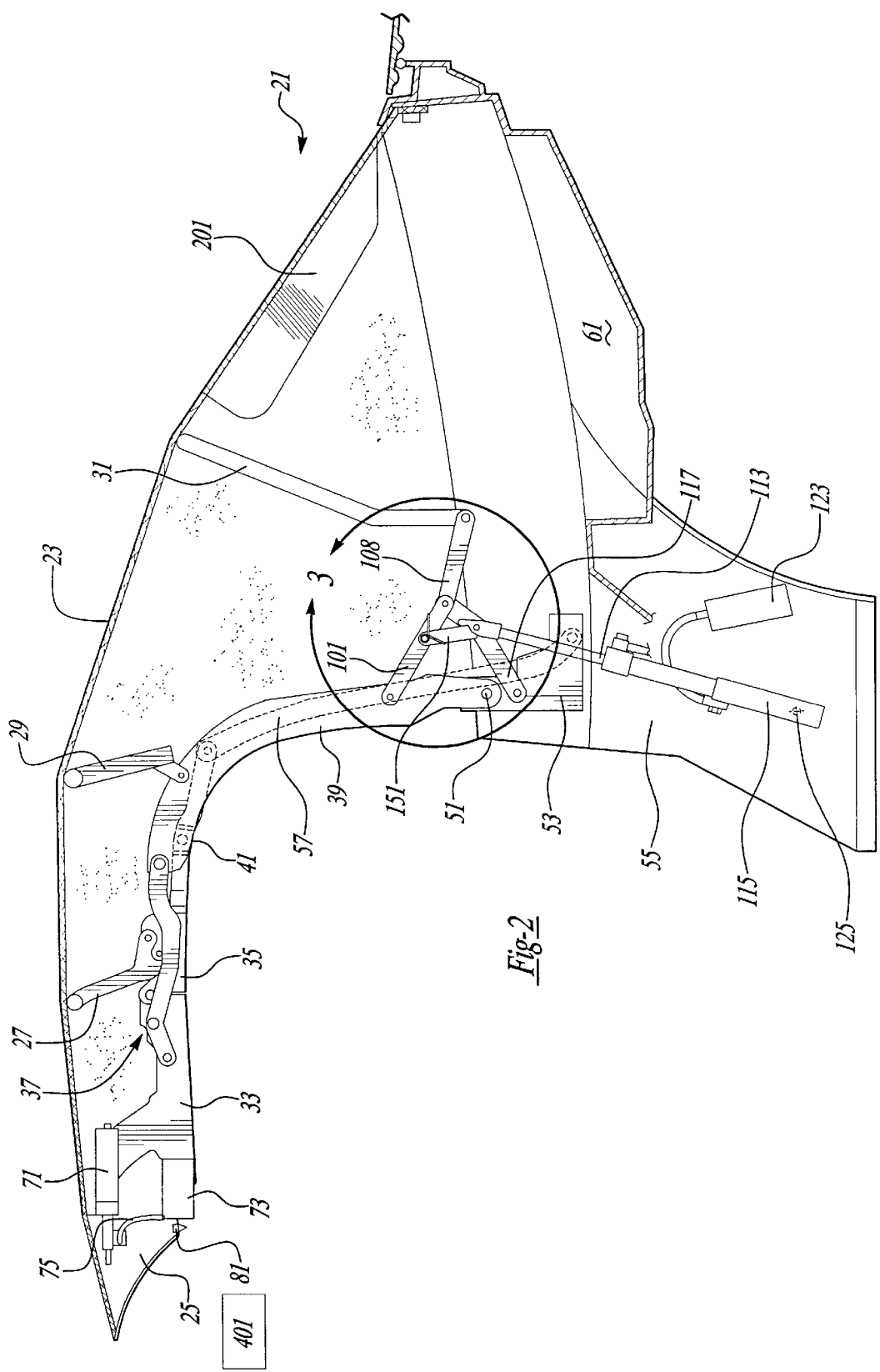
FIG. 2 is a side elevational view, partially in section, showing the preferred embodiment of the present invention convertible roof actuation mechanism, with a top stack mechanism disposed in a fully raised position and a number four roof bow disposed in an extended position.
Figure 5:
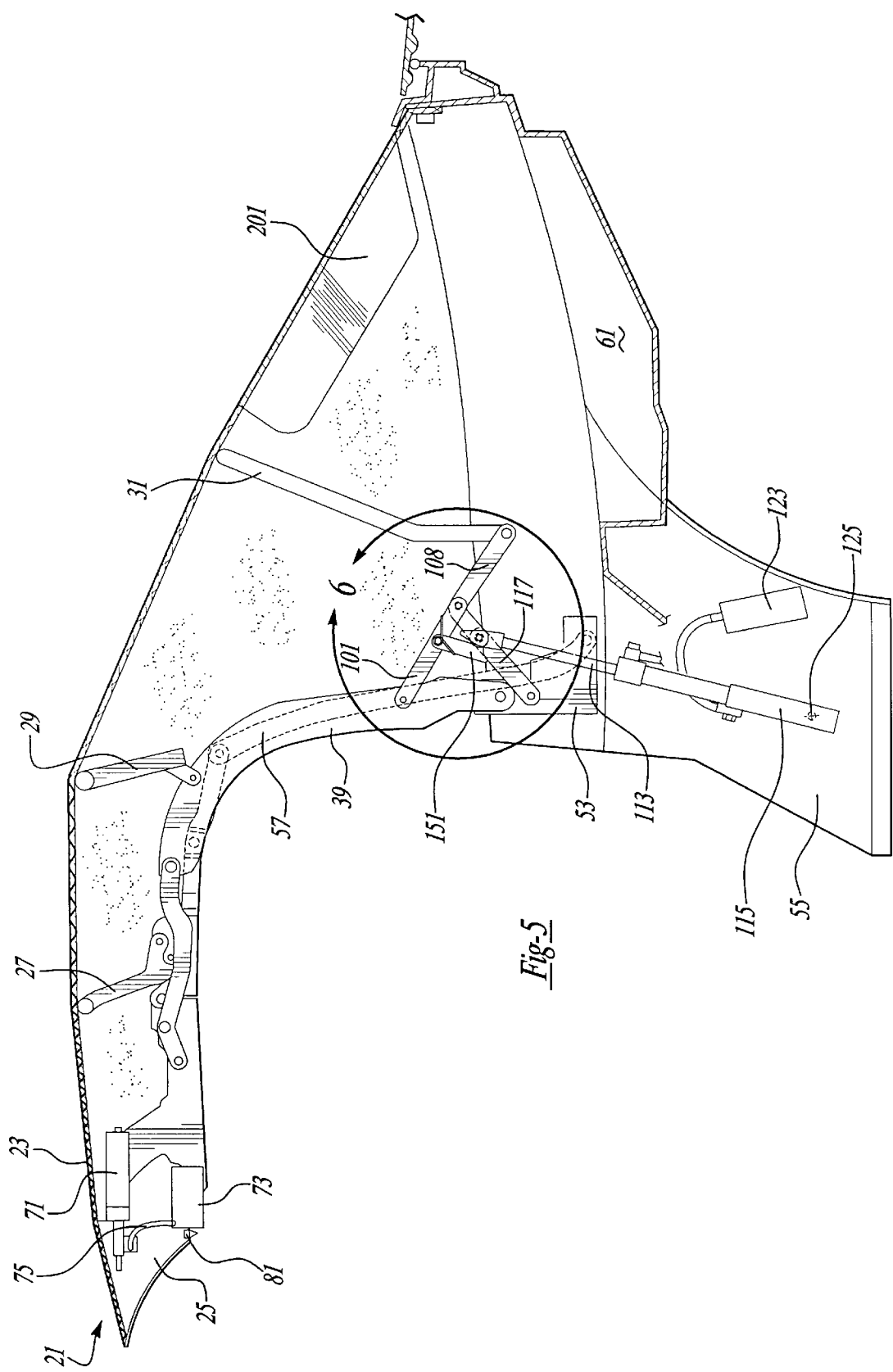
Figure 9:
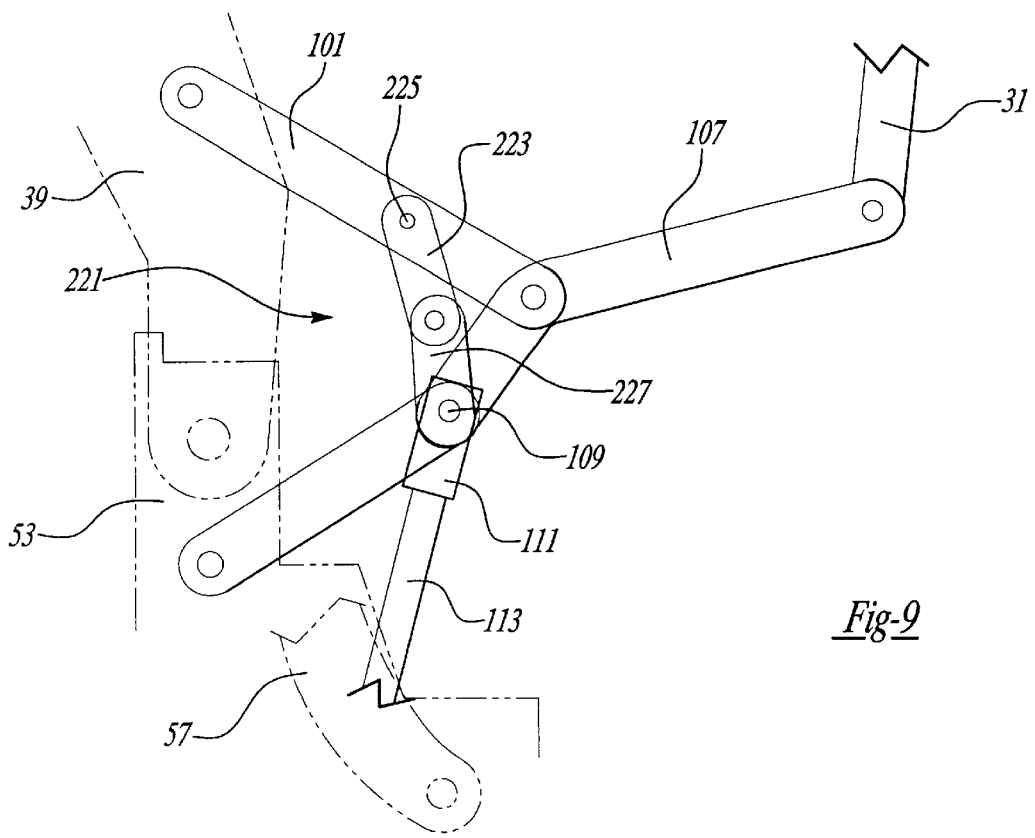
Figure 10:
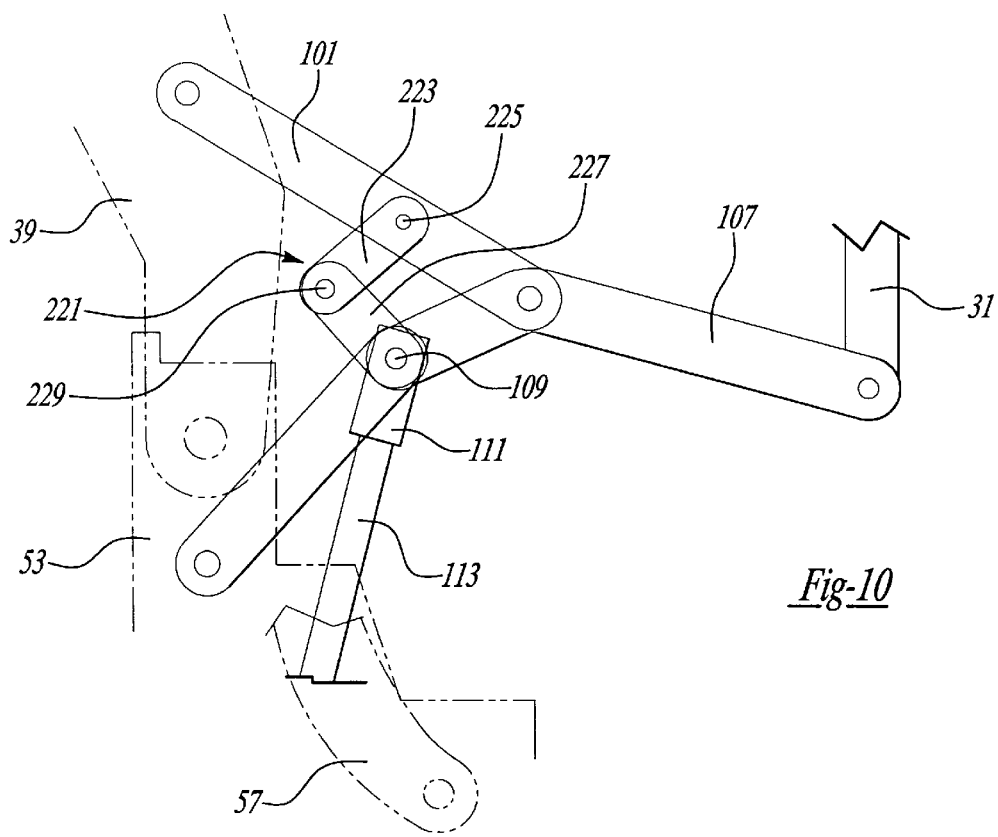
Figure 11:
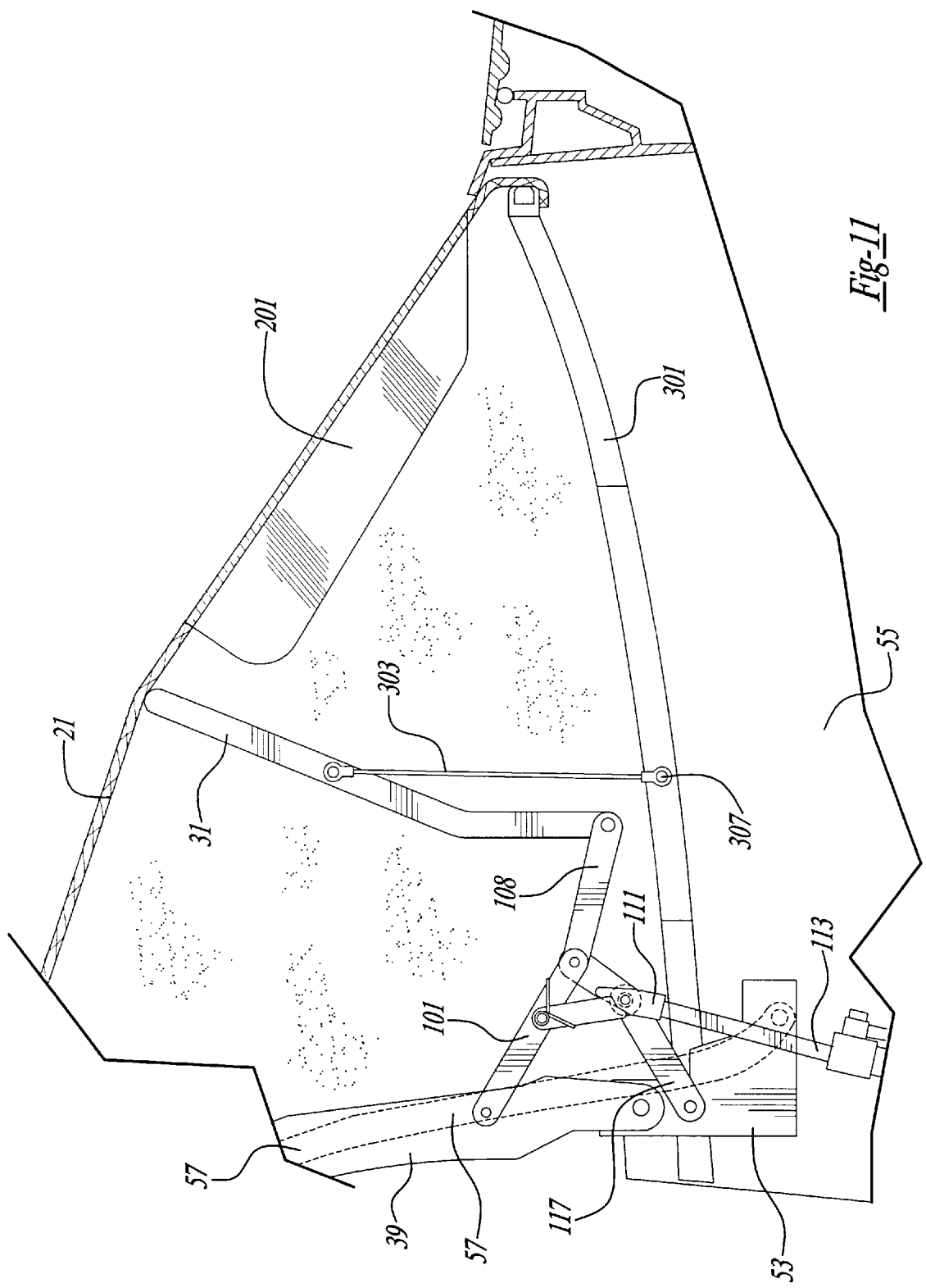
Figure 12:
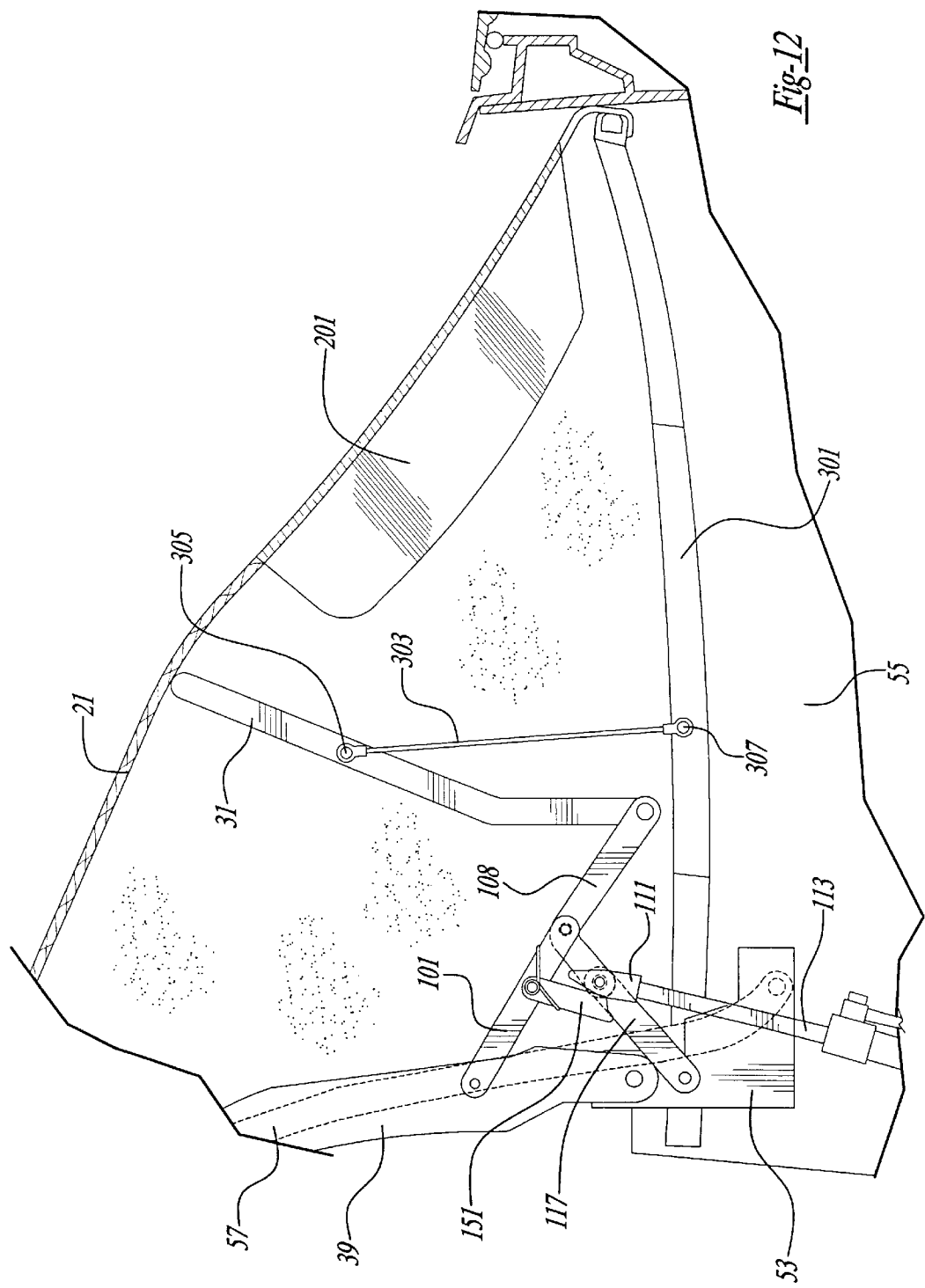

a FIG. 3 is an enlarged perspective view, taken within circle 3 of FIG. 2, showing the preferred embodiment of the present invention convertible roof actuation mechanism, with the top stack mechanism disposed in the fully raised position and the number four roof bow disposed in the extended position;

FIG. 4 is an enlarged perspective view, taken opposite FIG. 3, showing the preferred embodiment of the present invention convertible roof actuation mechanism, with the top stack mechanism disposed in the fully raised position and the number four roof bow disposed in the extended position;

FIG. 5 is a side elevational view, partially in section, showing the preferred embodiment of the present invention convertible roof actuation mechanism, with the top stack mechanism disposed in the fully raised position and the number four roof bow disposed in a retracted position;

FIG. 6 is an enlarged perspective view, taken within circle 6 of FIG. 5, showing the preferred embodiment of the present invention convertible roof actuation mechanism, with the top stack mechanism disposed in the fully raised position and the number four roof bow disposed in the retracted position;

FIG. 7 is an enlarged perspective view, taken opposite FIG. 6, showing the preferred embodiment of the present invention convertible roof actuation mechanism, with the top stack mechanism disposed in the fully raised position and the number four roof bow disposed in the retracted position;

FIG. 8 is a side elevational view, partially in section, showing the preferred embodiment of the present invention convertible roof actuation mechanism, with the top stack mechanism disposed in a fully retracted and stowed position, and with the number four roof bow disposed in the retracted position;

FIG. 9 is a diagrammatic side elevational view, showing a first alternate embodiment of the present invention convertible roof actuation mechanism, with a top stack mechanism disposed in a fully raised position and a number four roof bow disposed in an extended position;

FIG. 10 is a diagrammatic side elevational view, showing the first alternate embodiment of the present invention convertible roof actuation mechanism, with the top stack mechanism disposed in a fully raised position and the number four roof bow disposed in a retracted position;

FIG. 11 is a fragmentary side elevational view, partially in section, showing a second alternate embodiment of the present invention convertible roof actuation mechanism, with a top stack mechanism disposed in a fully raised position and number four and five roof bows disposed in extended positions; and FIG. 12 is a fragmentary side elevational view, showing the second alternate embodiment of the present invention convertible roof actuation mechanism, with the top stack mechanism disposed in the fully raised position and the number four and five roof bows disposed in retracted positions.

DETAILED DESCRIPTION OF THE PREFERRED EMBODIMENT

Figure 1:
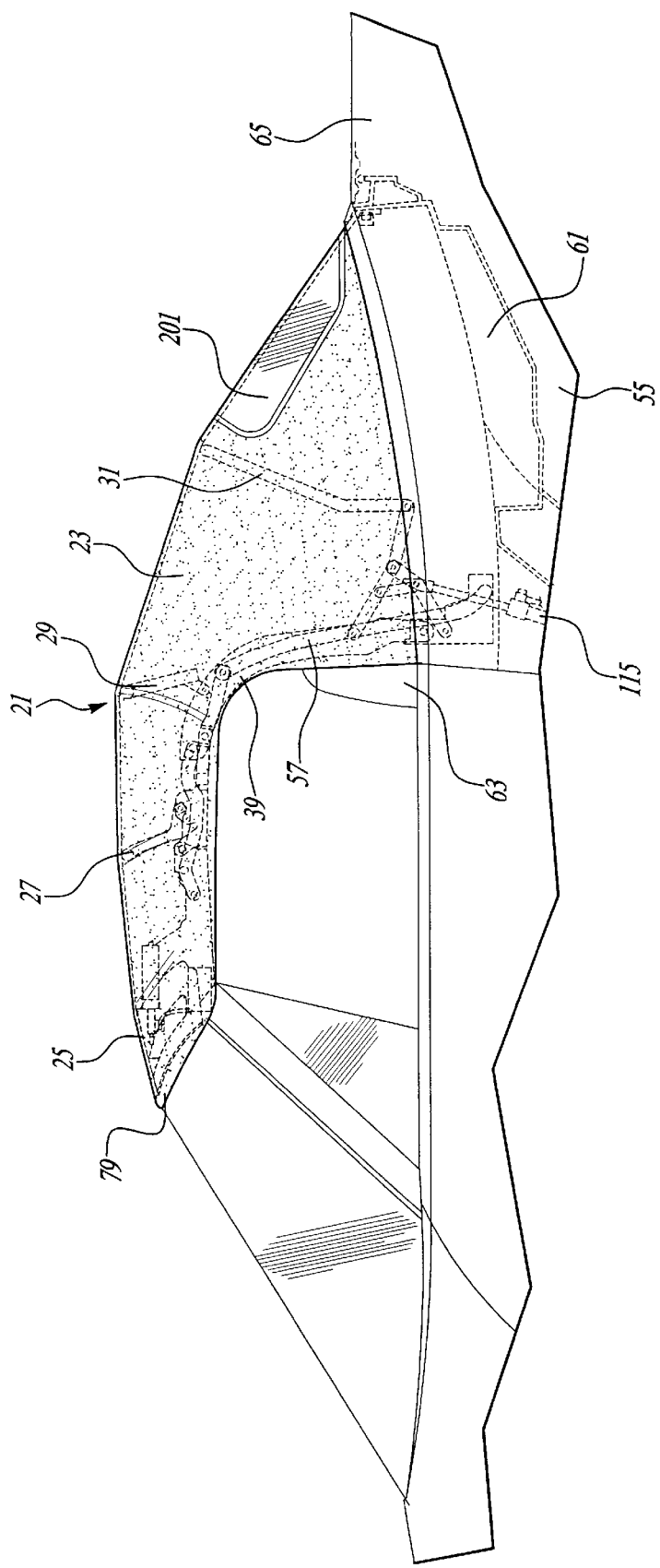
FIG. 1 is a side elevational view showing the preferred embodiment of a convertible roof actuation mechanism of the present invention.

As can be observed in FIGS. 1 and 2, a soft-top convertible roof for an automotive vehicle includes a top stack mechanism 21 and a pliable or flexible roof cover 23. Top stack mechanism 21 employs a number one roof bow 25, a number two roof bow 27, a number three roof bow 29 and a number four roof bow 31. Number one roof bow 25 is preferably integrally cast from an aluminum or magnesium alloy with a pair of front roof rails 33. A pair of center roof rails 35 are pivotally coupled to front roof rails 33 by over-center control linkage assemblies 37. Furthermore, a pair of rear roof rails 39 are coupled to center roof rails 35 by pivots 41. A bottom pivot 51 of each rear roof rail 39 is coupled for movement to a main pivot bracket 53 which is bolted or welded onto a stationary structure affixed to a body 55 of the automotive vehicle. A pair of balance links 57 each have a first end pivotally coupled to bracket 53 and a second end pivotally coupled to each center roof rail 35. Over-center control linkage assembly 37 is connected between front roof rail 33 and rear roof rail 39. Accordingly, the convertible roof can be automatically moved from a fully extended and raised position, as is shown in FIGS. 1 and 2, to a fully retracted and stowed position, as is shown in FIG. 8, within a storage compartment or boot well 61. Boot well 61 is longitudinally located between a front occupant seat 63 and a trunk 65. Rear roof rail 39 is preferably die cast and subsequently machined from an aluminum or magnesium alloy while balance link 57 and the roof bows are made from a carbon steel tubing with swaged ends. Main pivot bracket 53 is stamped from steel or is cast from aluminum or magnesium.

Roof cover 23 is in a stretched and tensioned condition when the convertible roof is in its fully raised condition, as is shown in FIGS. 1 and 2. In the fully raised position, a single sunroof-type electric motor actuator 71, centrally mounted to number one roof bow 25, is energized to push and pull sunroof-type cables 75 for driving a pair of outboard rotating latches 73. Latches 73 are rotated along generally horizontal, transverse planes to engage latching receptacle structures mounted to a front header panel 79 disposed above a windshield. Motor 71 tensions cables 75 for latching and compresses cables 75 for unlatching latches 73 through linear cams (not shown) which each operate in a transverse slide to lift a toggle mechanism for rotating the latch. The cams are mounted adjacent to each latch 73. A set of microswitches or proximity switches 81 are mounted on number one roof bow 25 to sense the engagement of latches 73 to the front header receptacles, thereby deenergizing motor 71 and also sending an electric signal to a microprocessor 401, or an analog or solid state based electronic control unit. Microprocessor 401 then automatically actuates the hydraulic actuator 115 for subsequently moving number four roof bow 31.

In an alternate embodiment, levers (not shown), having bifurcated ends, or bellcranks act in conjunction with fulcrums for downwardly and upwardly pivoting front roof rails 33 relative to center roof rails 35 in an automatic manner operably driven by electric motor 71. This lever device is disclosed in further detail in U.S. patent application Ser. No. 08/916,821 entitled "Latching and Control Apparatus for an Automotive Vehicle Convertible Roof," which was invented by Sheryar Durrani and was filed on Aug. 22, 1997, and U.S. patent application Ser. No. 08/916,822 entitled "Convertible Roof Actuation Mechanism" which was invented by Steven G. Laurain, Michael T. Willard and William A. Sims, and was also filed on Aug. 22, 1997; these patent applications are incorporated by reference herein.

In the preferred embodiment which is illustrated in the present figures, the automated fulcrums and levers are not used to allow for a manual over-center pull down of the number one bow for latching. Since the convertible roof actuation mechanism of the present invention is essentially symmetrically identical on both sides of the vehicle, only one side will be further discussed hereinafter.

Referring now to FIGS. 2, 3 and 4, a straight driving link 101 has a pivot 103 mounted on rear roof rail 39. A lower pivot 105 of number four bow 31 is also pivotally coupled to an opposite pivot 106 of driving link 101 by way of a first straight leg 107 of a generally V-shaped bow link 108. A pivot 109 mounted to a second straight leg 110 of bow link 108 is coupled to a yoke 111 attached to an end of a linearly moving piston rod 113 of a hydraulic fluid powered piston-type actuator. A follower link 117 has a first pivot 119 coupled to bracket 53 and a second pivot coupled to both actuator yoke 111 and bow link 108 at pivot 109. Stops 121 are affixed to edges of follower link 117. Abutting a tapered end of leg 110 of bow link 108 against stops 121 serves to limit the movement of bow link 108.

A piston cylinder 115 of the actuator is fluidically coupled to a hydraulic pump 123 and is electrically connected to a rear roof rail-to-bracket position sensing microswitch, a front roof rail-to-center roof rail position sensing microswitch, an occupant accessible top up/down switch and the electronic control unit. Piston cylinder 115 is allowed to pivot about a pivot point 125 in relation to the vehicle's body 55.

A locking structure includes a straight and elongated lock 151 having a proximal end pivotably coupled to a median section of driving link 101 by a pivot 153. A torsion spring 155 is also centrally mounted about pivot 153. Spring 155 has a first arm 157 secured to driving link 101 and a second arm 159 secured to an edge of lock 151 for biasing a distal end of lock 151 toward a lock receiving member 161. Lock receiving member 161 is a circular disk mounted inside yoke 111 coaxially about pivot 109. A circular-curved distal edge 163 (see FIG. 7) of lock 151 engages the periphery of lock receiving member 161 when the number four roof bow 31 is fully extended. This serves to maintain number four roof bow 31 in its extended position by deterring links 101 and 117 from collapsing or angularly moving toward each other. A disengagement finger 165 inwardly extends from a wall of yoke 111. Disengagement finger 165 has a generally circular peripheral shape which operably abuts against and pushes an edge of lock 151 from the locked orientation shown in FIGS. 3 and 4 to the unlocked orientations shown in FIGS. 6 and 7 to disengage lock 151 from lock receiving member 161 in a camming manner. Thereafter, the linkages are allowed to move relative to each other in response to the pivoting and linear movement of yoke 111 and piston rod 113, when unlocked, thereby retracting number four roof bow 31 to a cover tension reducing retracted position. Links 101, 108, and 117, and lock 151 are preferably stamped from sheet steel.

The raising operation of convertible roof will now be discussed in greater detail with reference to FIGS. 2–8. First, top stack mechanism 21 is fully stowed in boot well 61 as is shown in FIG. 8. In this position, piston rod 113 is fully withdrawn into piston cylinder 115. When the vehicle occupant actuates an electrical switch, the microprocessor or other electronic control unit will cause piston rod 113 to linearly advance from piston cylinder 115. This advancing movement of piston rod unfolds links 101, 108 and 117, thereby upwardly and forwardly pivoting rear roof rail 39 and the remainder of top stack mechanism 21 about rear roof rail pivot 51 and the pivot coupling balance link 57 to stationary bracket 53.

Next, piston rod 113 and the associated yoke 111 are fully advanced to the positions shown in FIGS. 5–7. This fully advanced piston rod and clevis orientation causes top stack mechanism 21, except for number four roof bow 31, to be placed in its fully raised position, while also leveraging bow link 108 about pivot 106 of driving link 101 such that number four roof bow 31 is in a retracted and lowered position. The retracted position of number four roof bow 31 reduces stretching tension of the fabric cover 23 to reduce the efforts by the vehicle occupant (for a manual system) or an automated over-center mechanism, in pulling down number one roof bow 25 adjacent to the front header and the subsequent manual or automated latching operations.

Subsequently, piston rod 113 and yoke 111 are again slightly retracted away from top stack mechanism 21 and cover 23 to an intermediate position thereby rotating leg 107 of bow link 108 upward about driving link pivot 106. This can be observed in FIGS. 2–4. This action serves to fully extend number four roof bow 31 so as to increase the tension of cover 23 and provide the desired final fit and finish, and head room desired in the convertible roof assembly. It is significant that the linkage assembly acts in a progressive manner whereby the side rail and top stack mechanism are first raised and then the number four roof bow is subsequently and independently extended while the rear roof rail and the remainder of the top stack mechanism are stationarily maintained in their fully raised positions. The latching of number one roof bow 25 to the front header assists in stabilizing rear roof rail 39 which acts as a stationary support for pivot 103 of driving link 101. During this slight retraction of piston rod 113 and yoke 111 to fully extend number four roof bow 31, spring 155 serves to bias lock into engagement with lock receiving member 161. The position sensing micro switches or potentiometers send the appropriate linkage position indicating signals to the micro processor for controlling advancing and retracting motion of piston rod 113.

It is envisioned that approximately ½ inch of piston rod retraction, from its fully advanced position to its intermediate position, will cause approximately 2 inches of linear movement of the number four roof bow, from its retracted position to its extended position, based on the geometry of the linkage arrangement. The link lengths and geometric power ratios can be altered for different desired mechanical advantages and differing travel distances. After front header latches 73 are unlatched and number one roof bow 25 and front roof rail 33 are upwardly pivoted relative to center roof rail 35, piston rod 113 will further retract into piston cylinder 115 to return top stack mechanism 21, including number four roof bow 31, to its stowed position.

The linkage positioning and geometry optimizes packaging of the folded top stack components and number four roof bow 31 such that a much larger than standard rigid, glass backlite 201 can be stored within the relatively small sized boot well 61. Backlite 201 has a length of at least 300 millimeters as measured along a vertical fore-and-aft plane and is three-dimensionally curved, however, number four roof bow 31 is fully retracted forward of a majority of backlite 201 and lower four bow pivot 105 is forward of the adjacent portion of piston rod 113. Backlite 201 is secured to roof cover 23 as is disclosed in U.S. patent application Ser. No. 08/916,820 entitled "Backlite Retention System for Use in an Automotive Vehicle Convertible Roof," which was invented by Steven G. Laurain and Michael T. Willard, and was filed on Aug. 22, 1997; this application is incorporated by reference herein.

FIGS. 9 and 10 illustrate a first alternate embodiment of the convertible roof actuation mechanism of the present invention wherein the locking structure includes a toggle mechanism 221. In this construction, a first toggle link 223 is pivotably coupled to driving link 101 at a pivot 225. A second toggle link 227 is pivotably coupled to first toggle link 223 at a pivot 229. Second toggle link 227 is further pivotably coupled to yoke 111 at pivot 109. Various stops and springs (not shown) will also be used to limit and bias movement of the toggle links. Thus, after actuating piston rod 113 has fully advanced and raised rear roof rail 39 to its fully raised position, and piston rod 113 then partially retracts to rotate number four bow link 107 to the number four bow extended position (shown in FIG. 9), toggle mechanism 221 is moved from the unlocked position of FIG. 10 to the over-center and locked position of FIG. 9. This maintains number four roof bow 31 in its fully extended cover tensioning position. A disengagement finger, such as that disclosed in the preferred embodiment, can be employed on yoke 111 to disengagably abut and cam toggle mechanism 221 to an unlocking orientation for retraction of number four roof bow 31.

Referring now to FIGS. 11 and 12, a second alternate embodiment of the convertible roof actuation mechanism of the present invention employs an optional number five roof bow 301 movably connected to a rear edge of roof cover 21. Number five roof bow 301 is used to push the cover outboard against the side rail and a beltline opening, or to provide additional roof cover skirt length for slack when retracting. Number five roof bow 301 only moves within boot well 62 below the beltline. Furthermore, number five roof bow 301 is movably coupled to number four roof bow 31 by way of a connector 303. It is envisioned that connector 303 is a flexible cable having a first eye 305 pivotally riveted to a middle section of number four roof bow 31 and having a second and oppositely disposed eye 307 pivotably riveted to a middle section of number five roof bow 301. Number five roof bow 301 is also pivotally journalled about stationary bracket 53. Thus, when number four roof bow 31 is moved from its retracted position as shown in FIG. 12 to its extended position as shown in FIG. 11, number five roof bow 301 will rise or extend in concert with number four roof bow 31. This further reduces convertible cover tensioning during fastening of the number one roof bow to the vehicle body.

While various aspects of the convertible roof actuation mechanism have been disclosed, it will be appreciated that many other variations may be employed without departing from the scope of the present invention. For example, multiple roof bows can be moved independently from the remaining fully raised and static top stack mechanism to selectively reduce and increase the roof cover tension thereby assisting with latching and pull down efforts. Furthermore, additional or fewer linkages of similar or alternate shapes may be employed to perform the present invention's specified functions. It is alternately envisioned that an electric motor actuator can be employed to directly move the disclosed linkages or other mechanically advantageous members for moving the number four roof bow relative to the remainder of the top stack mechanism, in place of a linear hydraulic actuator. The top stack can alternately be manually raised and retracted without any actuator, and the number one roof bow can employ manual J-hook style latches. Other rigid or flexible number four-to-five roof bow connectors can also be employed. Moreover, other locking structures can be used to prevent undesired collapsing of the linkage arrangement when the extendable roof bow is in its desired position. The disclosed lock and lock receiving member can also be reversibly mounted. Various materials and linkages have been disclosed in an exemplary fashion, however, other materials and linkages may of course be employed. It is intended by the following claims to cover these and any other departures from the disclosed embodiments which fall within the true spirit of this invention.

The invention claimed is:

1. A convertible roof system for an automotive vehicle, said system comprising:

a pliable roof cover;

a top stack mechanism including a tensioning roof bow and a roof rail, said roof cover being supported by said roof bow, said top stack mechanism and said roof cover being movable from a stowed position to a raised position;

an automatic powered actuator to operably move said top stack mechanism;

a first link coupling said roof bow to said actuator; and a second link coupling said first link to said roof rail;

selective energization of said actuator causing said roof bow to move from a bow retracted position to a bow extended position while the remainder of said top stack mechanism is located in its fully raised position;

movement of said roof bow increasing tension of said roof cover when said roof bow is in its extended position.

2. The system of claim 1 further comprising a locking structure pivotably mounted to at least one of said links operably acting to secure said roof bow in said extended position, a lock disengaging member moving with a portion of said actuator selectively contacting and moving said locking structure.

3. The system of claim 2 further comprising:

a spring biasing said locking structure relative to said at least one of said links;

a lock receiving member moving with said portion of said actuator; and an end of said locking structure disengagably contacting against said lock receiving member when said roof bow is in said extended position.

4. The system of claim 2 wherein said locking structure includes a toggle linkage arrangement coupling said actuator to at least one of said links.

5. The system of claim 1 wherein:

(a) said actuator fully advances to drive said top stack mechanism from its stowed position to its fully raised position;

(b) said roof bow is in a retracted position when said actuator is fully advanced; and (c) said actuator subsequently retracts to an intermediate position thereby moving the height of said roof bow to its fully extended position while maintaining the raised position of said roof rail.

6. The system of claim 5 further comprising a powered latching device mounted to a forward portion of said top stack mechanism, and a sensor sending a signal to an electronic unit connected to said powered actuator for indicating a predetermined top stack mechanism-to-body condition to control advancing and retracting movement of said actuator and said roof bow.

7. The system of claim 1 wherein said top stack mechanism includes:

a number one roof bow;

a number two roof bow; and a number three roof bow;

said tensioning roof bow being a number four roof bow which is movable without substantial movement of said roof rail and said number one, two and three roof bows when said roof rail and said number one, two and three roof bows are maintained in their fully raised positions.

8. The system of claim 7 further comprising:

a front seat;

a trunk;

a storage compartment disposed between said front seat and said trunk; and a three-dimensionally curved glass backlite fastened to said cover, said cover and said backlite being retractable into said storage compartment.

9. The system of claim 1 further comprising:
a bracket stationarily mounted to said vehicle;
a pivot of said roof bow coupled to said actuator by said first link; and
a third link pivotably coupling said actuator and said first link to said bracket.

10. The system of claim 1 further comprising a number five roof bow of said top stack mechanism movable from a retracted position to an extended position in concert with said tensioning roof bow after the remainder of said top stack mechanism is in its fully raised position, said number five roof bow being substantially horizontal when in its extended position.

11. An automotive vehicle comprising:
a stationary bracket;
a rear roof rail having a pivot, said pivot being coupled to said bracket, said rear roof rail being elongated in a substantially vertical direction when raised;
a roof bow having a pivot;
a linkage assembly coupling said pivot of said roof bow to said rear roof rail and said bracket;
a balance link pivotably coupled to said bracket; and
a single powered actuator on each side of the vehicle coupled to and driving said linkage assembly for moving said roof bow without substantially moving said balance link and said rear roof rail, said single powered actuator on each side of the vehicle also selectively moving said rear roof rail.

12. The vehicle of claim 11 further comprising a locking structure operably maintaining the position of said linkage assembly relative to said rear roof rail when said roof bow is in its extended position.

13. The vehicle of claim 12 further comprising:
a roof cover;
a lock receiving member mounted on a movable end of said actuator; and
a free distal end of said locking structure disengagably contacting against said lock receiving member when said roof bow is in an extended position for tensioning said cover.

14. The vehicle of claim 13 further comprising a spring biasing said locking structure relative to said linkage assembly.

15. The vehicle of claim 12 further comprising a disengagement member movable in concert with a portion of said actuator, said disengagement member operably disengaging a portion of said locking structure from a portion of said linkage assembly to allow movement of said roof bow independent from said rear roof rail when it is desired to retract said roof bow.

16. The vehicle of claim 11 further comprising:
a linearly moving piston rod of said actuator;
a yoke of said actuator mounted to said piston rod;
a pivoting four bow locking structure;
a four bow lock receiving member moving with said yoke; and
a disengagement member mounted on said yoke for selectively abutting against and disengaging said pivoting four bow locking structure from said four bow lock receiving member.

17. The vehicle of claim 12 when said locking structure includes a toggle linkage arrangement coupling a portion of said actuator to one of said links.

18. The vehicle of claim 11 further comprising:
a center roof rail pivotably coupled to said rear roof rail, said balance link coupling said center roof rail to said bracket; and
a number three roof bow coupled to one of said roof rails by a pivot.

19. The vehicle of claim 11 wherein said linkage assembly includes:
a first link coupling said roof bow to a pivot of said actuator;
a second link pivotably coupling said first link to said rear roof rail; and
a third link coupling a pivot of said first link, substantially opposite from a pivot of said roof bow, to a pivot of said bracket;
said third link also coupling said pivot of said actuator to said bracket.

20. The vehicle of claim 19 wherein said first link has a substantially V-like shape, said roof bow is a number four roof bow.

21. A convertible roof actuation mechanism for use in an automotive vehicle, said mechanism comprising:
a top stack mechanism including a roof rail;
a linkage assembly having a first link and a second link;
a roof bow forming part of said top stack mechanism and being movably driven independent of the remainder of said top stack mechanism by said linkage assembly when said top stack mechanism is in a fully raised position;
a lock having a first end movably coupled to one of said links;
a lock receiving member movable in concert with a portion of said second link, a second end of said lock selectively engaging with said lock receiving member to maintain the positional spacing of said first and second links while serving to maintain said roof bow in a predetermined position relative to the remainder of said top stack mechanism; and
a disengagement member operably causing said lock to disengage said lock receiving member when it is desired to move said roof bow relative to the remainder of said top stack mechanism.

22. The mechanism of claim 21 further comprising a spring biasing said lock relative to one of said links.

23. The mechanism of claim 22 wherein an end of said lock which engages said lock receiving member has a curved shape corresponding to a curved shape of said lock receiving member.

24. The mechanism of claim 21 further comprising an automatically powered actuator coupled to said linkage assembly for operably moving said at least one roof bow, said lock receiving member and said disengagement member being mounted on a moving end of said actuator.

25. A convertible roof actuation mechanism for use in an automotive vehicle, said mechanism comprising:
a roof cover;
a top stack mechanism supporting said roof cover;
a number four roof bow;
a linkage assembly coupling said number four roof bow to said top stack mechanism; and
a toggle link arrangement coupled to said linkage assembly and serving to selectively lock said number four roof bow in an extended position relative to said top stack mechanism;

said number four roof bow being retractable to reduce tension of said roof cover, even when said top stack mechanism is in a fully raised position, if said toggle linkage arrangement is located in an unlocked orientation.

26. A convertible roof actuation mechanism for use in an automotive vehicle having a convertible roof storage compartment, said mechanism comprising:

a flexible roof cover;

a number one roof bow attached to a front edge of said cover;

a number two roof bow supporting said cover;

a number three roof bow supporting said cover;

a number four roof bow supporting said cover and being movable while said number two and three bows are substantially stationary; and a number five roof bow affixed to a rear edge of said cover, said number five roof bow being movable in said storage compartment when said number two and three bows are substantially stationary;

wherein movement of said number four and five roof bows serve to reduce tautness of said roof cover when moved independently of said number two and three roof bows.

27. The mechanism of claim 26 further comprising a connector connecting portions of said number four and five roof bows at locations spaced away from pivots of said bows for concurrent movement of said number four and five roof bows.

28. The mechanism of claim 27 further comprising:

a side rail assembly coupled to said number one, two and three roof bows;

a linkage arrangement coupling said number four roof bow to said rail assembly; and a single automatically powered actuator, per side of vehicle, coupled to said linkage arrangement for selectively moving said number four and five roof bows independently of said number two and three bows.

29. The mechanism of claim 28 further comprising:

a rigid backlite affixed to said cover;

said single actuator, per side of vehicle, serving to raise said side rail assembly and subsequently independently move said number four and five roof bows.

* * * * *

UNITED STATES PATENT AND TRADEMARK OFFICE
CERTIFICATE OF CORRECTION

PATENT NO. : 5,998,948
DATED : December 7, 1999
INVENTOR(S) : Eric W. Lange et al It is certified that error appears in the above-identified patent and that said Letters Patent is hereby corrected as shown below:

Column 2, line 38, "backfires" should be -- backlites --.

Column 2, line 62, delete "a".

Column 7, line 20, "boot well 62" should be -- boot well 61 --.

Column 9, line 65, "when" should be -- wherein --.

Signed and Sealed this

Twenty-third Day of January, 2001

Attest:

Q. TODD DICKINSON

*Attesting Officer*  *Commissioner of Patents and Trademarks*

UNITED STATES PATENT AND TRADEMARK OFFICE
CERTIFICATE OF CORRECTION

PATENT NO.   : 5,998,948
DATED        : December 7, 1999
INVENTOR(S)  : Eric W. Lange, Kenneth L. Wardell and Rick J. Simpson It is certified that error appears in the above-identified patent and that said Letters Patent is hereby corrected as shown below:

<u>Title page,</u>
Item [73], Assignee, "ACS Incorporated" should be -- ASC Incorporated --.

Signed and Sealed this

Twelfth Day of November, 2002

Attest:

JAMES E. ROGAN
Attesting Officer        Director of the United States Patent and Trademark Office